United States Patent [19]

Takemura et al.

[11] Patent Number: 5,019,925
[45] Date of Patent: May 28, 1991

[54] REEL BRAKE CONTROL DEVICE FOR OPTICALLY CONTROLLING A REEL BRAKE OF A MAGNETIC TAPE APPARATUS

[75] Inventors: Shigeo Takemura, Yokohama; Katsuyuki Taguchi, Hirakata, both of Japan

[73] Assignee: Matsushita Electric Industrial Co., Ltd., Osaka, Japan

[21] Appl. No.: 496,209

[22] Filed: Mar. 20, 1990

Related U.S. Application Data

[63] Continuation-in-part of Ser. No. 162,101, Feb. 29, 1988, abandoned.

[30] Foreign Application Priority Data

Feb. 27, 1987 [JP] Japan .................................. 62-45589

[51] Int. Cl.$^5$ ............................................. G11B 15/22
[52] U.S. Cl. ...................................................... 360/71
[58] Field of Search ................................ 360/71, 74.6

[56] References Cited

FOREIGN PATENT DOCUMENTS 0045327 10/1982 European Pat. Off. .
3315167A1 10/1983 Fed. Rep. of Germany .
48-18241 6/1973 Japan .
2117962 10/1983 United Kingdom .
2119751A 11/1983 United Kingdom .

Primary Examiner—Robert S. Tupper
Attorney, Agent, or Firm—Wenderoth, Lind & Ponack

[57] ABSTRACT

A magnetic tape recording and reproducing apparatus includes tape leading end and tape trailing end detecting devices, each for detecting transparent and non-transparent portions of a magnetic tape. A control means is provided for activating and deactivating a reel brake in accordance with signals output by the tape leading end and tape trailing end detecting devices. The reel brake is provided for stopping a rotation of a reel which drives the magnetic tape.

1 Claim, 2 Drawing Sheets

REEL BRAKE CONTROL DEVICE FOR OPTICALLY CONTROLLING A REEL BRAKE OF A MAGNETIC TAPE APPARATUS

BACKGROUND OF THE INVENTION

1. Field of the Invention

The present invention relates to a magnetic recording and reproducing apparatus, such as a rotary head type digital audio tape recorder, and more particularly, to a device for engaging and releasing a reel brake device in response to the engaging and disengaging of a cassette tape in a tape driving device of a magnetic recording and reproducing apparatus.

2. Description of the Related Art

FIG. 5 shows a configuration of a conventional braking arrangement of a magnetic recording and reproducing apparatus. In FIG. 5, numeral 1 denotes a cassette tape detecting device for detecting when a cassette tape has been operatively engaged in a tape driving device, and numeral 2 denotes a reel braking device which operates and releases a reel brake.

The operation of the conventional braking arrangement of the magnetic recording and reproducing apparatus will now be explained. In the device shown FIG. 5, a cassette tape engagement switch is closed and a reel braking device 2 causes the reel brake to engage. When a user detaches the cassette tape from the tape driving device, the cassette tape engagement switch 1 is opened and the reel braking device 2 causes the reel brake to be released.

However, in the conventional braking arrangement as described above, a problem can occur when a user detaches the cassette tape from the tape driving device. Due to variations in the detection accuracy of the cassette tape engagement switch 1, the reel brake is released before the cassette tape is completely detached from the tape driving device, thereby causing an unnecessary sagging or a positional deviation of the tape within the cassette.

BRIEF SUMMARY OF THE INVENTION

An object of the present invention is to solve the problems of the conventional braking arrangement described above and to provide a magnetic recording and reproducing apparatus which ensures precise timing of the engaging and releasing of a reel brake by using a tape leader end and a tape trailer end detecting device, conventionally equipped with a tape driving device for other purposes, instead of the cassette tape engagement switch 1.

To achieve the above object, the apparatus of the present invention is equipped with a tape leader end detecting device and a tape trailer end detecting device which utilize light transmission to detect the transparent leader tape portion and the non-transparent magnetic tape portion of a magnetic tape, and a logic unit which engages and releases the reel braking device according to the output status of the tape leader end and tape trailer end detecting devices.

Consequently, according to the present invention, when a user inserts a cassette tape into a tape driving device, and when the tape leader end detecting device or the tape trailer end detecting device has detected the non-transparent magnetic tape portion, the reel brake is engaged. When a user detaches the tape cassette from the tape driving device, the reel brake is released at a time when neither the tape leader end detecting device nor the tape earlier end detecting device detect the non-transparent magnetic tape portion.

DESCRIPTION OF THE PREFERRED EMBODIMENT

Figure 1:
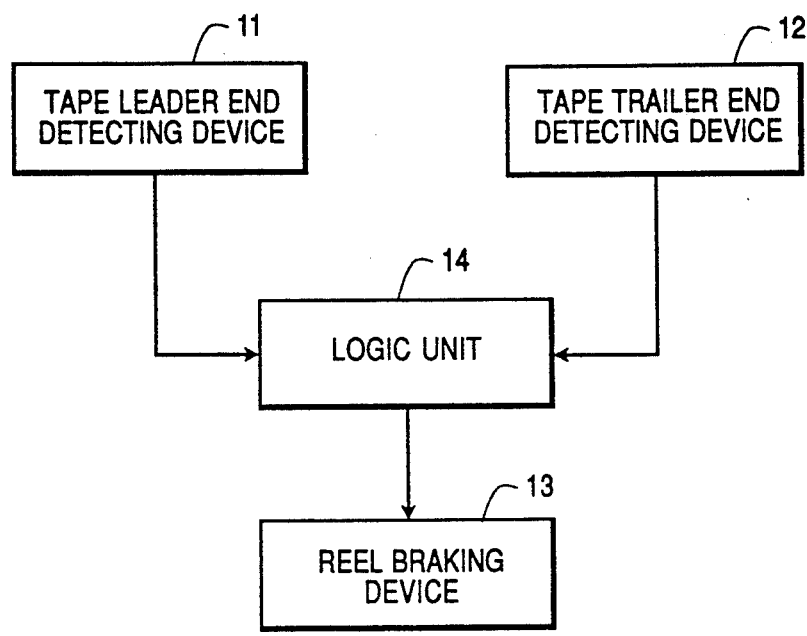
FIG. 1 is a block diagram of an embodiment of the present invention.

FIG. 1 is a block diagram of an embodiment of the present invention. In FIG. 1, numeral 1 denotes a tape leader end detecting device which utilizes light transmission to detect a transparent leader tape portion of the leader end of a magnetic tape, and numeral 12 denotes a tape trailer end detecting device which utilizes light transmission to detect the transparent leader tape portion of the trailer end of a magnetic tape. Numeral 13 denotes a reel braking device for engaging and disengaging a reel brake, and numeral 14 denotes a logic unit for driving and controlling the reel braking device 13 according to the output status of the tape leader end detecting device 11 and the tape trailer end detecting device 12.

Figure 2:
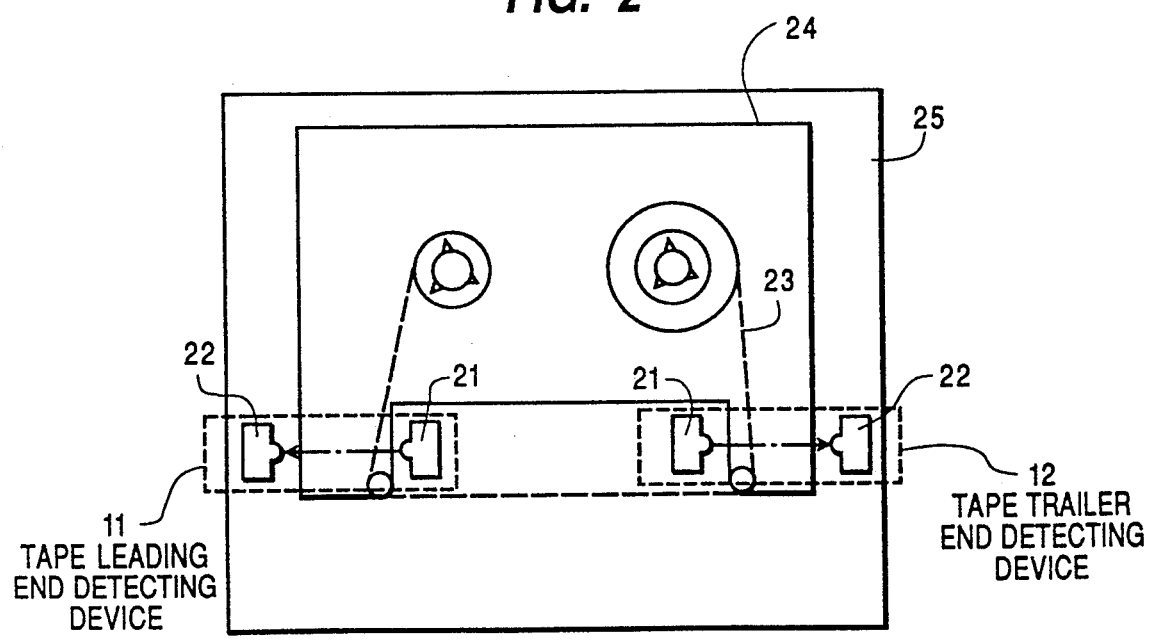
FIG. 2 is a schematic diagram for explaining the tape leader end detecting device and the tape trailer end detecting device shown in FIG. 1.

FIG. 2 is a schematic diagram for explaining the tape leader end detecting device 11 and a tape trailer end detecting device 12 shown in FIG. 1. In FIG. 2, numeral 21 denotes photo emitters installed in a tape driving device 25 and numeral 22 denotes photo sensors installed in the tape running device 25. Numeral 23 denotes a magnetic recording tape having transparent leader tape sections at the leader end and trailer end portions thereof. Each leader tape section has a length such that the tape leader end detecting device 11 and the tape trailer end detecting device 12 cannot detect both leader tape sections simultaneously. Numeral 24 denotes a cassette for housing the magnetic recording tape 23.

Next, the operation of the tape leader end detecting device 11 will be explained. In the device shown FIG. 2, when the portion of the tape 23 present at a position between the photo emitter 21 and the photo sensor 22 is non-transparent, the light emitted from the photo emitter 21 is not transmitted to the photo sensor 22, thus indicating that this portion of the tape 23 is magnetic and that the cassette 24 is engaged in the tape driving device 25. Furthermore, when the portion of the tape 23 present at the position between the photo emitter 21 and the photo sensor 22 is a transparent leader tape or when the tape 23 is not present at all at this position, the light from the photo emitter 21 is transmitted to the photo sensor 22, thus indicating that either the leader end or trailer end of the tape 23 is present or that the cassette 24 is disengaged from the tape running device 25.

Figure 3:
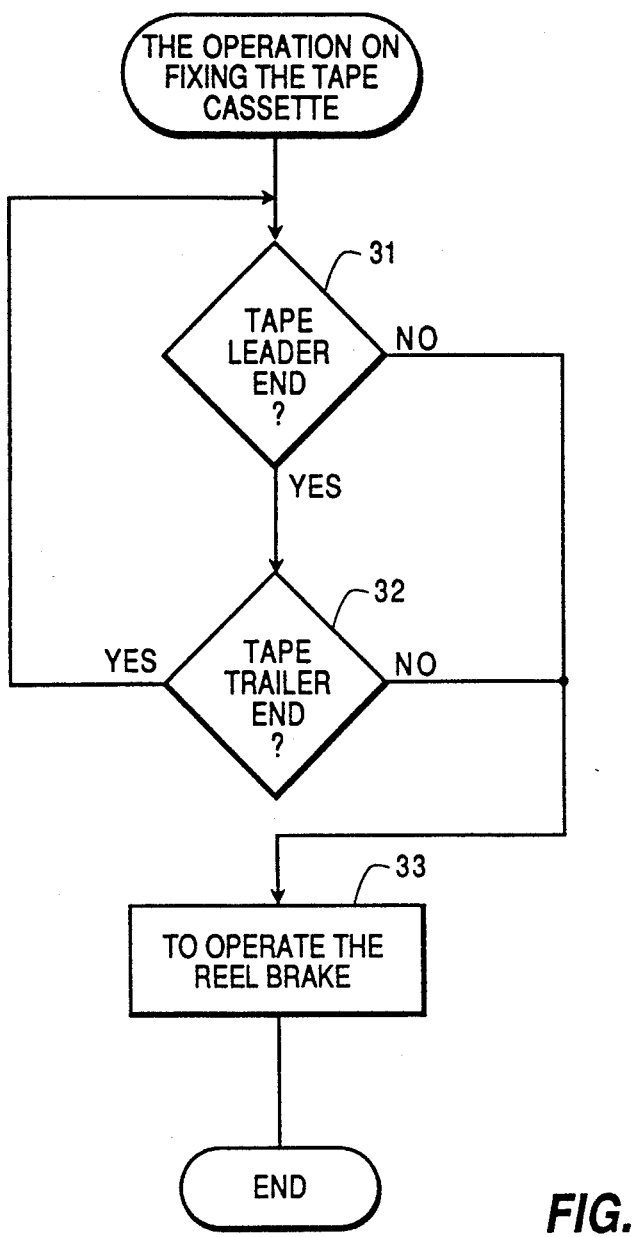
FIG. 3 and FIG. 4 are operational flowcharts of the embodiment of the present invention; and, FIG. 5 is a block diagram of a conventional braking arrangement of a magnetic recording and reproducing apparatus.
Figure 4:
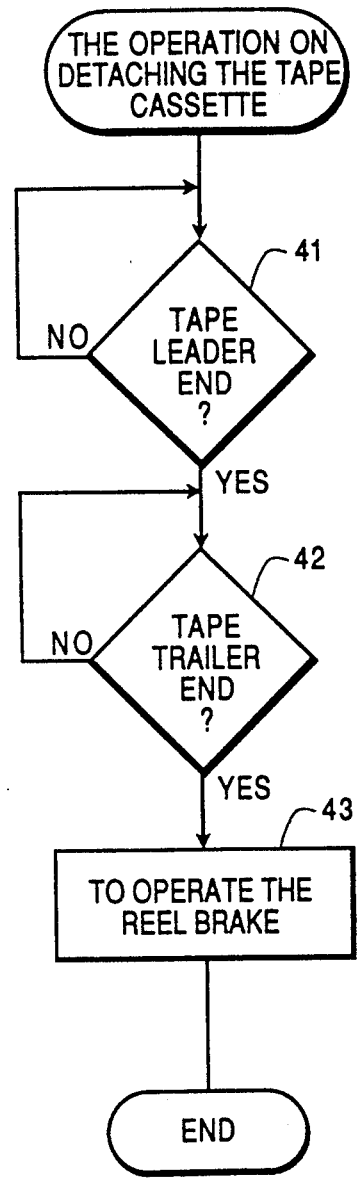
Figure 5:
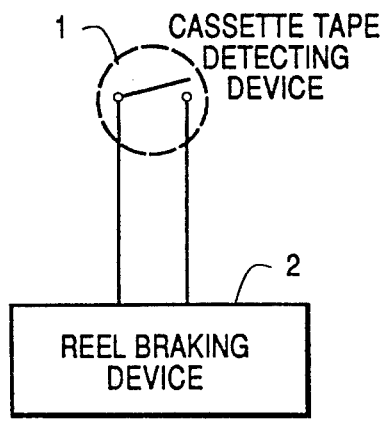

FIG. 3 and FIG. 4 are operational flowcharts of the above embodiment. FIG. 3 depicts the operation of the reel braking device 13 when the cassette 24 is being inserted into the tape driving device 25. At step 31, if the tape leader end detecting device 11 does not denote the presence of the transparent tape leader end, meaning that a non-transparent portion of the tape 23 is present between the photo emitter 21 and the photo sensor 22, it is assumed that the cassette 24 has been inserted into and engaged with tape driving device 25, and the operation advances to step 33. At step 32, when in step 31 the leader end portion of the tape 23 is detected (or no tape at all is detected), and when the tape trailer end detecting device 12 does not denote the presence of the tape trailer end, the operation advances to step 33. However, when a condition exits in which both the tape leader end and the trailer end are believed to be detected at steps 31 and 32, which means in actuality that no cassette 24 is present in the tape driving device 25, then steps 31 and 32 are repeated until the cassette 24 is engaged in the tape driving device 25. At step 33, the logic unit 14 controls the reel braking device 13 to engage the reel brake.

FIG. 4 shows the operation of the reel braking device 13 when the cassette 24 is being detached from the tape driving device 25. At steps 41 and 42, when both the tape leader end detecting device 11 and the tape trailer end detecting device 12 denote the presence of a transparent tape end (thereby detecting the absence of the tape 23), it is assumed that the cassette 24 has been detached from the tape driving device 25 and the operation advances to step 43. At step 43, the logic unit 14 controls the reel braking device 13 to release the reel brake. Until both of the leader end and the trailer end of the tape 23 are indicated as being detected at steps 41 and 42, steps 41 and 42 are repeated until the cassette 24 is detached from the tape driving device 25.

Once the cassette 24 is engaged in the tape driving device 25, the next three steps are sequentially effected to achieve a stand-by status of the apparatus:
(1) the reel hub brake which is equipped to the cassette 24 itself is released after the engagement of the reel brake;
(2) the take-up reel or the feed reel is rotated to eliminate sagging; and,
(3) the reel brake of the take-up reel is released to draw the tape 23 from the cassette 24 so as to contact the tape 23 to a magnetic rotating head.

During the stand-by status, the reel brakes of the take-up reel and feed reel are engaged in order to prevent the tape 23 from sagging when the apparatus is shaken.

As described above, according to the above embodiment, it is not necessary to provide a special detecting device to detect when the cassette 24 has been inserted into or detached from the tape driving device 25. The engagement and the release of the reel braking device 13 is effected using the tape leader end and tape trailer end detecting devices 11, 12.

As is apparent from the above embodiment, the apparatus of the present invention detects the engaging and detaching of the cassette 24 is the tape driving device 25 according to the output status of the tape leader end detecting device 11 and the tape trailer end detecting device 12, which optically detect the transparent leader tape portions and the non-transparent magnetic portion of a tape 23, to thereby engage and release a reel brake.

The apparatus of the present invention offers the following advantages:
(1) it is not necessary to provide a special detecting device to detect when the cassette is inserted into and detached from the tape driving device; and,
(2) unnecessary sagging and positional deviation of the tape within the cassette when inserting or detaching the cassette from the tape driving device is reduced.

What is claimed is:

1. A reel brake control device for controlling a reel brake of a magnetic tape according and reproducing apparatus, the reel brake activating to engage at least one of a feed reel and a take-up reel of the magnetic tape recording to reproducing apparatus, the feed reel and the take-up reel for driving a magnetic tape of a cassette, the magnetic tape having transparent leading and trailing portions and a main non-transparent portion therebetween, the cassette for detachably engaging with the magnetic tape recording and reproducing apparatus, said reel brake control device comprising:

a tape leading end detecting means for outputting a first operating state when detecting one of the transparent leading portion of the magnetic tape and an absence of the magnetic tape, and for outputting a second operating state when detecting the main non-transparent portion of the magnetic tape;

a tape trailing end detecting means for outputting a third operating state when detecting one of the transparent trailing portion of the magnetic tape and an absence of the magnetic tape, and for outputting a fourth operating state when detecting the main non-transparent portion of the magnetic tape; and, wherein the transparent leading and trailing portions each have a length which prevent simultaneous detection thereof by said tape leading end detecting means and said tape trailing end detecting means;

a logic means, coupled to said tape leading end detecting means and said tape trailing end detecting means and having means for connection to the reel brake, for activating the reel brake when at least one of said second operating state and said fourth operating state is output by said tape leading end detecting means and said tape trailing end detecting means respectively, and for deactivating the reel brake when both said first operating state and said third operating state are output by said tape leading end detecting means and said tape trailing end detecting means respectively;

whereby engagement of the cassette in the magnetic tape recording and reproducing apparatus is detected when at least one of said second operating state and said fourth operating state is output by said tape leading end detecting means and said tape trailing end detecting means respectively, and whereby disengagement of the cassette from the magnetic tape recording and reproducing apparatus is detected when both said first operating state and said third operating state are output by said tape leading and detecting means and said tape trailing end detecting means respectively.

* * * * *